3,498,884
PROCESS FOR PRODUCING PRIMYCIN
Tibor Vályi-Nagy and Gábor Kulcsar, Debrecen, Imre Szilágyi, Budapest, Gabriella Valu, Debrecen, and Károly Magyar, Géza Hegyaljai Kiss, and Istvan Horvath, Budapest, Hungary, assignors to Chinoin Gyogyszere es Vegyeszeti Termekek Gyara Rt., Budapest, Hungary
No Drawing. Filed Oct. 18, 1966, Ser. No. 587,428
Claims priority, application Hungary, Oct. 20, 1965, CI–577
Int. Cl. C12b 1/00
U.S. Cl. 195—80                                 5 Claims

ABSTRACT OF THE DISCLOSURE

A process for the production of primycin wherein *Thermopolyspora galeriensis* is fermented in suitable nutrient medium. The primycin is recovered from the fermentation broth by precipitation, extraction and removal of primycin from the extracting solvent.

---

This invention relates to an improved process for producing primycin.

It is well known that the antibiotic primycin, originally obtained by cultivating the strain *Streptomyces primycini*, possesses very valuable therapeutic properties. The antibiotic obtained from fungi has been recoverd by direct extraction from the fermentation broth or by acidification of the fermentation broth and by carrying out a so-called precipitating adsorption. (Nature 174, 1105, 1954; Pharmazie 11, 304, 1956; Hungarian Patent No. 146,332, 1958; and No. 151,197, 1963.)

The strain *Streptomyces primycini* displays on various nutrient media, rich in nitrogen sources, a very low productivity which can not be increased to achieve a reasonably economic industrial productivity level either by using other nutrients or by further selection. The selection of natural varients of this strain was rather difficult because the strain *S. primycini* does not produce on solid nutrients either aerial mycelia or spores (Acta Pharm. Hung. XXXI, 3, 133, 140).

The subject matter of the present invention is a new process for the production of primycin with a sufficiently high yield for industrial production; this process is characterized by cultivating the new microorganism strain *Thermopolyspora galeriensis*—deposited with the Hungarian Institute for Public Health under No. 650,707—or descendants, variants or mutants of same, on a nutrient medium containing organic sources of carbon, organic sources of nitrogen, inorganic salts and advantageously natural and/or synthetic fats, oils, fatty alcohols or fatty acids in a stirred and aerated submerged culture and, after reaching an adequate antibiotic activity, isolating the obtained raw primycin from the fermentation medium.

The strain *Thermopolyspora galeriensis* used in the process of the invention is micromorphologically essentially different from the strains generically known as Streptomyces, and thus also from the *Streptomyces primycini* and can be classified—according to the system of Waksman and of Krasilnikow—in the class of Thermopolyspora of Micromonospora, respectively. The aerialmycelia of this strain do not possess the characteristics of the strain Streptomyces, i.e. mycelia are not fractioned into spores, but the round or oval spores, detached or in groups, develop on the short ramifications of the mycelia. The new strain (*Thermopolyspora galeriensis*) according to the invention differs from the strain *Streptomyces primycini*—already described—also in its essential morphologic characteristics, by producing great quantities of spores and by forming well developed air-mycelia on the nutrient media used. The mycelium manifests in the course of its development—depending on the nutrient media used—a certain inclination to lysis.

The strain *Thermopolyspora galeriensis*, isolated by us, surpasses, as to its high antibiotic-production yield) all varieties of *Streptomyces primycini* strain described hitherto, which could generally produce not more than 250–300 γ/ml. primycin. Though some variants of this earlier strain could in some cases and intermittently produce much higher yields (e.g. the strain described in the Hungarian Patent 151,197 yielding 1100 γ/ml.), yet such productivity could not be maintained permanently under continuous industrial conditions. In contradistinction the variants obtained from this new strain by further mutagenic treatment and by selection have produced a continuous yield of 2000–4000 γ/ml. and thus have proved to be absolutely adequate for the production of antibiotics on an industrial scale.

The strain *Thermopolyspora galeriensis* displays on various nutrient media a wide range of colors; depending on the ingredients of the nutrient medium, on outward influences (irradiation, chemical substances, etc.) and also on the mycelia's age it may possess various hues from a greyish white through a pale yellow and yellowish brown up to a dark green—almost every color can be observed.

The colonies generally are—on optimal nurtient media—round, lentil-sized, protruding and spheroidal; owing to spontaneous mutation or to various influences (e.g. to X-ray irradiation) colonies of concentrically ribbed or irregularly wrinkled forms can also be obtained. On insufficient nurtient media smaller, even dot-like colonies are formed.

If a thick, concentrated inoculum is used, the colonies will form on optimal nutrient media a thick, wrinkled furry layer.

Regardless of form, size or color of the colonies, on adequate nutrient media uniformly good fermentation results are always obtained. A higher temperature (37° C.) is still preferable for the developed of these fungi, than the usual 27° C. of the Streptomyces strains in general, yet under industrial conditions at temperature of 27–28° C. also gives fair results.

Aerial mycelia are fine, thin and they display within a relatively short time (48 hours) characteristic small spores, the number of which greatly increases with time. Depending on the composition and on the temperature of the nutrient medium, mycelia can undergo a lysis on the third or fourth day.

The behavior of this new Thermopolyspora strain has been tested on 97 different nutrient media. Results of these tests are presented in the following Tables I–III.

Table I shows characteristics of the growth, tested on the internationally known so-called "Waksman nutrient medium." Column 1(I) of the table contains data of the white variety of the *Thermopolyspora galeriensis*, column 2(I/1) those of the green variety, while column 3(I/2) contains data of a yellow variety.

The growth of microorganisms has been continually watched and results were registered at different intervals, i.e. after 72, 120, 168, 240 and 336 hours of incubation.

TABLE I

Behavior of three varieties of the *Thermopolyspora galeriensis* on different nutrient media (Waksman series):

I = *Th. galeriensis*, white variety
I/1 = *Th. galeriensis*, green variety
I/2 = *Th. galeriensis*, yellow variety

| Nutrient medium | Growth I | I/1 | I/2 |
|---|---|---|---|
| Czapek-agar | (+) | (+) | (+) |
| Glucose-asparagine-agar | +++ | +++ | +++ |
| Glycerine-agar | − | − | − |
| Tyrosine-agar | +++ | +++ | ++ |
| Meat-peptone-agar | ++++ | ++++ | ++++ |
| Glucose-peptone-agar A | ++++ | ++++ | ++++ |
| Glucose-peptone-gelatine | ++++ | ++++ | ++++ |
| Meat-peptone-gelatine | (+) | (+) | (+) |
| Peptone-gelatine | (+) | (+) | (+) |
| Starch-agar with an inorganic nitrogen source | (+) | (+) | (+) |
| Starch-agar with an organic nitrogen source | + | + | +(+) |
| Egg-protein-agar | + | (+) | + |
| Potato-agar | ++++ | ++++ | ++++ |
| Potato-glucose-agar | ++++ | ++++ | ++++ |
| Starch-NO₃-agar | (+) | | (+) |
| Glucose-broth | (+) | (+) | (+) |
| Nutrient broth | +++ | +++ | +++ |
| Czapek solution | | | (+) |
| Starch solution | − | (+) | (+) |
| Yeast-extract (A) | +++ | +++ | +(+) |
| Yeast-extract (B) (Mg+Fe) | ++ | ++ | +(+) |
| Yeast-glucose-agar | ++++ | ++++ | ++++ |
| Emerson-agar | − | − | (+) |
| Corn steep liquor | ++++ | ++ | ++(+) |
| Soya-meal/flour nutrient | ++++ | ++++ | ++++ |
| Synthetic lactate nutrient | − | − | − |
| Calcium malate nutrient | + | + | +(+) |
| Cellulose digestion | | | |
| Litmus milk | Does not coagulate, weak red tint | | |
| Peptone-gelatine | Liquefaction | | |
| Nitrate nutrient | (+) | (+) | ++ |
| Potato plugs | ++++ | +++ | + |
| Carrot plugs | (+) | (+) | (+) |
| Cystine-nutrient medium | No H₂S formation | | |

Explanation of signs:
++++ = Very good growth
+++ = Good growth
++(+) = Fairly good growth
++ = Average growth
+(+) = Moderate growth
+ = Mediocre growth
(+) = Very poor growth
− = No growth The variant I/1 produces a green pigment on potato plugs and on glucose-peptone-agar, while the variant I/2 produces a brown pigment on tyrosine-agar.

The influence of the various nitrogen sources upon the growth of *Thermopolyspora galeriensis* has been tested in the following manner: the nitrogen nitrate, figuring as inorganic nitrogen source in the Czapek-Dox nutrient media has been replaced by equivalent quantities (counted on the nitrogen) of the separate organic nitrogen sources.

Table II summarizes the different characteristics observed in the growth of the three variants of *Thermopolyspora galeriensis* on Czapek-Dox nutrient media, modified by various organic nitrogen sources. Growth and pigmentation of the colonies have been tested at various times (after 72, 120, 168, 240 and 336 hours) in the growth of this strain.

TABLE II

Growth of the three variants of *Thermopolyspora galeriensis* on nutrient media containing different nitrogen sources.

| Nitrogen source | Extent of growth I | I/1 | I/2 |
|---|---|---|---|
| dl-Tyrosine | +(+) | ++(+) | ++ |
| Uracil | + | (+) | + |
| dl-Glutamine | +++ | ++ | ++ |
| dl-Phenylalanine | ++(+) | ++ | ++ |
| Adenylic acid | ++(+) | ++ | +(+) |
| dl-Leucine | ++(+) | ++ | ++ |
| Cytosine | + | (+) | + |
| Thymonucleic acid | (+) | + | ++ |
| Hypoxanthine | + | (+) | + |
| dl-Norleucine | ++ | ++ | ++ |
| dl-Valine | ++(+) | ++(+) | ++(+) |
| dl-Serine | ++ | ++(+) | +++ |
| l-Ornithine | ++ | ++(+) | ++ |
| l-Asparagine | ++(+) | ++ | ++(+) |
| l-Cysteine | ++ | ++ | ++ |
| Sarcosine | (+) | (+) | (+) |
| Cytidine | ++(+) | ++ | ++(+) |
| β-Alanine | + | + | +(+) |
| dl-Proline | +(+) | + | +(+) |
| l-Threonine | ++(+) | ++(+) | ++ |
| Glycine | ++(+) | ++(+) | ++ |
| l-Lysine | + | ++ | + |
| l-Arginine | +(+) | +(+) | +(+) |
| Uridine | + | + | + |
| l-Histidine | +(+) | ++ | +(+) |
| l-Tryptophane | + | (+) | +(+) |
| l-Citrulline | +(+) | ++(+) | +(+) |
| dl-αAmino-n-butyric acid | +(+) | ++ | +(+) |
| (NH₄)₂SO₄ | +++ | +++ | ++ |
| Ribonucleic acid | ++ | + | +(+) |

Explanation of signs: see Table I.

Strain I produces on nutrient media containing l-Tryptophane a brown pigment.

Variant I/1 produces a various nitrogen sources (dl-Tyrosine, dl-Phenylalanine, Cytidine, l-Lysine, l-Arginine, ammoniumsulphate etc.) a green pigment.

Variant I/2 produces on l-Tryptophane containing nutrient media a brown pigment.

In order to establish the carbon-utilization capacity of the new strain a nitrogen-containing Czapek nutrient medium has been used, the sucrose content of which has been replaced by an equal quantity of carbon sources enumerated in Table III. The growth of microorganisms has been registered 72, 120, 168, 240 and 336 hours after incubation. The results thus obtained are demonstrated in Table III.

TABLE III

Growth of three variants on *Thermopolyspora galeriensis* on different carbon sources.

| Carbon source | Extent of the growth I | I/1 | I/2 |
|---|---|---|---|
| Saccharose | + | + | +(+) |
| Glucose | + | (+) | + |
| Mannitol | + | + | +(+) |
| Galactose | − | (+) | (+) |
| Sorbose | − | − | − |
| Xylose | − | − | − |
| Rhamnose | +(+) | + | ++ |
| Arabinose | − | − | − |
| Lactose | − | − | − |
| Fructose | − | − | (+) |
| Maltose | − | − | − |
| Ribose | − | − | − |
| Glycerine | + | + | +(+) |
| Sodium acetate | (+) | (+) | +(+) |
| Sodium citrate | − | − | − |
| Sodium tartrate | − | (+) | +(+) |
| Sodium formate | (+) | (+) | (+) |

Explanation of signs: see Table I.

Since according to our experience inorganic nitrogen sources are generally unfavorable for the development of *Thermopolyspora galeriensis*, we have also tested the influence of different carbohydrates upon the growth of this strain, also in the presence of an organic nitrogen source (l-Asparagine).

As nutrient medium the Czapek-Dox nutrient medium has been used again, the sodium nitrate content of which has been, however, replaced by an equivalent quantity of l-Asparagine and its saccharose content by an equal quantity of different carbohydrates figuring in Table III.

The growth of microorganisms has been tested after 72, 120, 168, 240 and 336 hours of incubation at a temperature of 37° C. The results are summarized in the following Table IV.

TABLE IV

Growth of *Thermopolyspora galeriensis* on different carbon sources in the presence of an organic nitrogen source (l-Asparagine).

| Carbon source: | Extent of growth |
|---|---|
| Saccharose | ++++ |
| Glucose | ++++ |
| Mannitol | ++++ |
| Galactose | ++ |
| Sorbose | — |
| Xylose | — |
| Rhamnose | ++++ |
| Arabinose | — |
| Lactose | ++++ |
| Fructose | — |
| Maltose | ++ |
| Ribose | — |
| Glycerine | ++++ |
| Sodium acetate | ++++ |
| Sodium citrate | — |
| Sodium formate | + |
| Sodium tartrate | + |

Explanation of signs: see Table I.

For the production of primycin the strain *Thermopolyspora galeriensis* is grown preferably on a nutrient medium containing carbohydrates, such as starch or saccharose as organic carbon source; nitrogen-containing organic substances, such as soya flour, yeast-suspension etc. as nitrogen source and partly as anti-foam agent, partly as a further carbon source different animal or vegetable oils and fats or their components, such as palm oil, sunflower oil, stearic acid, glycerine etc. and as inorganic salts mainly alkali phosphates and chlorides, as well as calcium carbonate.

Fermentation is advantageously carried out at temperatures between 27° and 40° C.; at higher temperatures, at about 37° C. the growth rate of fungi is increased and thus the fermentation period can be decreased; under industrial circumstances, however, fair results and high yields can be obtained also at 27–28° C. The fermentation is carried out under stirring and aeration.

The primycin gained from the microorganisms may be isolated from the fermentation product according to the known extraction methods, for instance with n-butanol. The process according to the invention yields, however, a much higher primycin-concentration as compared with the known fermentation processes, and the use of the generally known organic solvents for the extraction is rather difficult, since primycin does not dissolve in apolar solvents, and it generally dissolves poorly in polar solvents. In order to isolate the produced primycin from the mycelia, it therefore, is preferably to use a binary or ternary mixture of polar solvents, advantageously e.g. 80 percent aqueous methyl alcohol. It is advantageous to proceed in the following manner:

The reactant content of the fermentation broth is precipitated with the mycelia at an elevated temperature of about 70° to 90° C. from a mildly acid medium (pH=5 to 7); thereafter the antibiotic agent is extracted from the obtained moist precipitate by boiling with a polar-solvent mixture, advantageously with an aqueous alcohol, e.g. 80 percent methanol (aqueous). The crude product having a strong antibiotic activity can be isolated by evaporating the solvent mixture. Primycin is known to be thermostable and displays no loss of activity after boiling for 10 hours; the reactant is thus not decomposed but is adsorbed on the mycelia denaturated by boiling and on other proteins present. The precipitate containing the antibiotic substance adsorbed is then separated by filtering or by centrifuging. The supernatant liquid contains but very slight quantities (2 to 20 γ/ml.) of primycin and can be discarded. The moist mycelium is then boiled with the solvent mixture advantageously with aqueous methanol whereby almost the entire antibiotic content is dissolved. The solution separated from the precipitate is then evaporated in vacuo whereby the crude primycin is precipitated; the water soluble impurities remain mainly in the aqueous mother liquor and can be easily separated from the primycin by vacuum filtration. In this way a relatively pure crude product of high antibiotic activity (40 to 70% primycin content) is obtained with a fair yield (70 to 90% of the antibiotic activity of the fermentation broth).

Further purification of the crude product obtained in the above described manner and the recovery of primycin of 100% purity can be effected in known manner. According to the usual method the primycin contained in an aqueous alcoholic solution is separated from the alcohol-soluble proteins by precipitation with lead salts; the pigment-like impurities still present are removed by aid of a mixture of active carbon and a neutral solid diluent of great surface area (cellulose powder, "Hyflo" filtering medium, precipitated calcium carbonate etc.) and the primycin is isolated from the pure solution in the known manner.

The production of primycin by fermentation of the new microorganism strain and isolation of the crude primycin from the fermentation broth is illustrated in more particulars by the following examples:

EXAMPLE 1

Laboratory fermentation of *Thermopolyspora galeriensis*

For the production of the inoculum the following nutrient medium is used:

| | Percent |
|---|---|
| Soya flour | 2.0 |
| Potato starch | 2.0 |
| Calcium carbonate | 0.5 |
| Sodium chloride | 0.3 |
| Potassium dihydrophosphate | 0.1 |
| Palm oil | 0.5 | pH before sterilisation, 8.5

The above nutrient medium is heated for 24 minutes in an autoclave under 1.5 atm. Hereafter 100 ml. portions of the nutrient medium are placed in 500 ml. flasks and inoculated with a suspension of spores or mycelia of the strain *Thermopolyspora galeriensis*; the flasks are then shaken at a temperature of 27° C. for 48 to 60 hours on a shaking table with 5 cm. stroke.

The thus-prepared inoculum is then inoculated into a nutrient medium of the following composition:

| | Percent |
|---|---|
| Soya flour | 4.0 |
| Potato starch | 4.0 |
| Calcium carbonate | 0.5 |
| Sodium chloride | 0.3 |
| Potassium dihydrophosphate | 0.1 |
| Palm oil | 0.1 |
| Stearic acid | 0.3 | pH before sterilization 8.8.

This nutrient medium is then heated in an autoclave under 1.5 atm. for 25 minutes, then distributed in 30 to to 35 ml. portions into 500 ml. flasks and 1 to 5% of the above-described inoculum are added. The flasks are shaken at a temperature of 28° C. for 97 to 120 hours. The primycin-content of the so obtained fermentation product can be determined by biological measurements.

EXAMPLE 2

Factory scale fermentation of *Thermopolyspora galeriensis*

A pre-inoculum is prepared on a nutrient medium of the following composition:

| | Percent |
|---|---|
| Soya flour | 4.0 |
| Potato starch | 4.0 |
| Calcium carbonate | 0.5 |
| Sodium chloride | 0.3 |
| Potassium dihydrophosphate | 0.1 |
| Palm oil | 0.5 | pH before sterilization 8.5.

The nutrient medium is sterilized in autoclaves at 1.5 atm. for 25 minutes, then disposed in portions of 100 ml. into flasks, inoculated with a spore or mycelium suspension of the strain *Thermopolyspora galeriensis* and shaken for 48 to 60 hours at a temperature of 27° C. This pre-inoculum is then transferred into an inoculum nutrient medium of the following composition:

| | Percent |
|---|---|
| Soya flour | 4.0 |
| Potato starch | 4.0 |
| Calcium carbonate | 0.5 |
| Sodium chloride | 0.3 |
| Potassium dihydrophosphate | 0.1 |
| Palm oil | 1.0 | pH before sterilization 8.8.

100 litres of the above nutrient are sterilized for 1 hour at 1.3–1.5 atm. in an iron fermentor, 1 to 5 vol. percent of the above pre-inoculum are added and the substance is incubated at a temperature of 27° C. for 48 to 60 hours under stirring (250 r.p.m.) and aeration. The thus-obtained culture is used as inoculum for the fermentation.

The fermentation is effected in a fermentor made of iron or stainless steel having 1 m.$^3$ working volume. Into this fermentor a nutrient medium of the following components is placed:

| | Percent |
|---|---|
| Soya flour | 4.0 |
| Potato starch | 4.0 |
| Calcium carbonate | 0.5 |
| Sodium chloride | 0.3 |
| Potassium dihydrogenphosphate | 0.1 |
| Palm oil | 0.3 |
| Stearic acid | 0.3 | pH before sterilization 8.8 to 9.0.

The above nutrient medium is sterilized for 1 hour at 1.3 to 1.5 atm. then 10 vol. percent of the above inoculum are added. Fermentation is continued at a temperature of 27° C. for 96 to 120 hours under constant stirring (at least 250 r.p.m.) and aeration (at least 1:1).

EXAMPLE 3

Recovery of crude primycin from a fermentation product obtained in laboratory

The fermentation broth obtained according to Example 1—the antibiotic agent of which has been found by titration to be 520 to 530 γ/ml.—(this antibiotic activity calculated on 10 liters of the shaken culture corresponds to a total pure primycin content of 5.2 g.) is acidified with 1 N H$_2$SO$_4$ to pH 5 to 6, heated to 70° C. The separated mycelia containing the major part of the antibiotic were separated by centrifugation. The supernatant liquid contained only 11 γ/ml. antibiotics (2.1% of the produced entire antibiotic activity) and could therefore be discarded.

The moist precipitate was heated on a steam bath six times with 1.5 liters portions of 80% aqueous methanol for 1 hour and separated again by centrifugation. The antibiotic was extracted into the aqueous methanol; the unified methanol extracts (of which the two last extracts, containing almost no primycin any longer, can be discarded) were evaporated in vacuo to an entire volume of 1.25 liters; the separated crude product is filtered by suction and dried in vacuo at a temperature of 40° C. 10.6 g. crude primycinw ere obtained; the crude product had 41% antibiotic activity and contained 4.35 g. pure primycin. The yield calculated on the 5.2 g. primycin content of the fermentation product was 84%. The mother liquor still contained 5% primycin.

EXAMPLE 4

Recovery of crude primycin from the fermentation product in industrial scale

The total quantity of 1 m.$^3$ fermentation broth obtained according to Example 2, the pyrimycin content of which (determined by titration) was 1600 γ/ml., was heated to 80–90° C. at a pH value of 6 to 7, and then filtered while hot. The filtrate having but a low antibiotic activity (10 γ/ml.) was discarded; the mycelia containing 70% moisture and of 12.46 kg. total weight, having a primycin content of 1.6 kg. has been processed further in two portions.

(a) The first part (61.2 kg.) of the moist precipitate has been admixed with 250 liters 80% methanol, heated to boiling and stirred for 3 hours. The liquid phase was then separated by filtration; the so obtained filtrate (240 liters) shows an antibiotic activity of 2860 γ/ml., corresponding to a primycin content of 287 g. pure primycin (43% of the entire activity of the starting liquid).

(b) The second part (63.4 kg.) of the above moist mycelia was unified with the above mentioned extracted and filtered mycelia and then extracted in a similar way but with 400 liters of 80% aqueous methanol. The 430 liters methanolic solution, separated by filtration, displays an antibiotic activity of 2000 γ/ml., e.g. a total content of 860 g. pure primycin (54%).

(c) The 80 kg. moist precipitate remaining after the second extraction was boiled up again with further 400 liter 80% aqueous methanol. The so obtained filtrate had 50 γ/ml. antibiotic activity, and contained thus only 16.5 g. pure primycin (1.03%). In these three extracts 98% of the entire antibiotic activity of the starting products have been recovered; the third methanolic extract could, however, be discarded, owing to its low antibiotic-content.

Extracts (a) and (b) were unified and the so obtained 670 liter aqueous methanolic solution was evaporated in vacuo at a temperature of 40–45° C. to a volume of 91 liters; it has been subsequently cooled to +6° C. and allowed to stand for 20 hours. The separated crude primycin was filtered by suction in vacuo. This mother liquor displayed an antibiotic activity of only 40 γ/ml.

The filtered crude product was dried in vacuo at 40° C. to a constant weight. 1.93 g. of crude primycin has been obtained, the activity of which corresponds to a content of 1.25 kg. pure primycin. The yield calculated on the antibiotic activity of the fermentation product was thus 78.3%.

What we claim is:

1. A process for the production of primycin, comprising the steps of fermenting in a stirred and aerated culture a microorganism selected from the group which consists of *Thermopolyspora galeriensis*, descendant strains, variant strains and mutants thereof, in a nutrient medium for such fermentation containing organic sources of carbon and nitrogen at a temperature and pH and for a period sufficient to produce primycin in the culture; and thereafter recovering primycin from the culture.

2. The process defined in claim 1 wherein: said temperature ranges between substantially 27° C. and 40° C.; said pH ranges between 6 and 9; said organic sources of carbon are selected from the group which consists of starches, sugars and other carbohydrates; said organic sources of nitrogen are selected from the group which consists of amino acids, organic nitrogen-containing bases, acid amides, soya flour and cornsteep liquor; and said nutrient medium further includes at least one inorganic salt selected from the group which consists of phosphates, nitrates, chlorides and carbonates.

3. The process defined in claim 2 wherein said nutrient medium includes at least one further ingredient selected from the group which consists of natural and synthetic fats, oils, fatty alcohols and fatty acids.

4. The process defined in claim 3 wherein said nutrient medium includes at least one ingredient selected from the group which consists of palm oil and stearic acid.

5. The process defined in claim 2 wherein said primycin is recovered from said culture by the steps of: precipitating from said culture primycin together with mycelia of the culture by heating the culture at a pH of 5 to 7; extracting the precipitated primycin from the mycelium by boiling same with a polar-solvent mixture; and removing the primycin from said mixture.

References Cited

Nature, vol. 174, No. 4441, Dec. 11, 1954, pp. 1105–1106.

MAURICE W. GREENSTEIN, Primary Examiner

U.S. Cl. X.R.

195—82